Patented Oct. 22, 1935

2,017,993

UNITED STATES PATENT OFFICE 2,017,993

RESIN AND COATING OR PLASTIC COMPOSITION CONTAINING THE SAME

George W. Seymour, Cumberland, Md., assignor to Celanese Corporation of America, a corporation of Delaware No Drawing. Application April 16, 1932, Serial No. 605,791

1 Claim. (Cl. 260—2)

This invention relates to the preparation of a synthetic resin from a phenol and sulfur dichloride, and also to coating or plastic compositions containing derivatives of cellulose and particularly organic derivatives of cellulose.

An object of my invention is to prepare a synthetic resin that is compatible with derivatives of cellulose, and therefore suitable for use in films, lacquers or other coating compositions or plastics containing such derivatives of cellulose.

A further object of my invention is to provide a suitable resin for lacquers or plastic compositions containing derivatives of cellulose, which resin is compatible with the other constituents of the lacquers and which produces clear solutions which upon drying form films that are adherent, tough and hard, water-resistant and fast to light.

The preparation of a lacquer containing organic derivatives of cellulose such as cellulose acetate as the main constituent of the lacquer base, which lacquer is to be applied to a hard, smooth surface presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the film produced from it, both the lacquer and the film produced therefrom become cloudy and unhomogeneous.

I have found that synthetic resins produced by the condensation of a phenol with sulfur dichloride in the absence or presence of a suitable catalyst are compatible with cellulose acetate, and that when added to lacquers containing cellulose acetate they form clear solutions that upon drying produce clear, hard and tough and firmly adherent films, which are fast to light and resistant to water.

In accordance with my invention, I prepare special synthetic resins formed by the reaction of a phenol with sulfur dichloride. These synthetic resins are then used for making a lacquer or plastic composition which contains one or more derivatives of cellulose and a volatile solvent. The lacquer may contain also one or more natural or semi-synthetic resins or gums, one or more plastifiers or softening agents, medium and/or high boiling point solvents and preferably, but not necessarily some pigments and/or dyes.

Solutions thus formed may be employed as a lacquer or composition for metal, glass or other surfaces and may be used for making photographic or other films. Artificial yarns may be formed by extruding the solution containing the derivative of cellulose and the special resin through the orifices of a spinneret, either into a heated evaporative atmosphere as in dry spinning, or into a precipitating bath as in wet spinning. The solution may also be employed as an adhesive, and is particularly useful in this connection for making shatterless glass by causing celluloid sheets to adhere to surfaces of sheets of glass between which they are placed.

The plastic composition containing derivatives of cellulose and the special resin may be worked into sheets which may also be used for laminated glass, and also may be worked into blocks or articles in any known manner.

Molding compositions may be made by intimately mixing the organic derivative of cellulose with the special resin with or without plasticizer, and these compositions may be molded under heat and pressure to form any articles of desired shape.

The derivative of cellulose that may be used for making the solutions for coating or plastic compositions comprises any suitable derivative, such as cellulose nitrate or organic derivatives of cellulose. Examples of organic derivatives of cellulose are organic esters of cellulose such as cellulose acetate, cellulose formate, cellulose propionate and cellulose butyrate or cellulose ethers such as ethyl cellulose, methyl cellulose and benzyl cellulose.

The low boiling point solvent that may be employed may be one or a mixture of two or more of the following: Acetone, ethylene formal, alcohol, benzene or ethylene dichloride. Examples of medium and/or high boiling point solvents are ethyl acetate, ethyl lactate, formal glycerol, tetrachlorethane, benzyl alcohol or diacetone alcohol. Of course it is understood that the choice of the solvents depends on the solubility characteristics of the particular derivative of cellulose employed. Examples of suitable plastifiers are diphenylol propane, triacetin, dibutyl tartrate, diethyl phthalate, dimethyl phthalate, toluene sulfonamid, mono methyl xylene sulfonamid. If desired, fire retardants may be added, particularly the very effective bromine derivatives of organic compounds, such as brominated tricresyl phosphate. The pigments or dyes that may be used may be those ordinarily employed in the paint or lacquer industry.

Of the natural gums or resins that may be added, the following may be mentioned: manila, acaroides, pontianak, kauri, dammar, rosin and shellac. The semi-synthetic resin, ester gum, which is the glycerol ester of rosin may be also added. If desired, synthetic resins, other than the special phenol-sulfur dichloride resin may be employed in conjunction therewith, and examples of these are the fusible and soluble phenol-formaldehyde or diphenylol propane-formaldehyde resins preferably prepared in the presence of acid catalysts.

The special resins made by and employed in this invention may be prepared by reacting a phenol with sulfur chloride. The term "phenol" includes not only simple phenol, $C_6H_5OH$, but substituted phenols, such as cresols; halogenated phenols, such as dichlor-phenol; and other nuclear substitution products of phenol.

While the phenol may be caused to react with the sulfur dichloride in the presence of diluents such as carbon bisulfide, and at elevated temperatures, I have found that the best results, from the point of view of compatibility with cellulose acetate and solubility in available volatile liquids, are obtained when the condensation is caused to take place at low temperatures, that is at temperatures below 20° C., and any excess sulfur dichloride is permitted to evaporate at temperatures not substantially exceeding room temperature. Likewise better results are obtained when the amount of sulfur dichloride employed for the reaction is in excess of the amount of phenol.

The following is a specific example of one mode of making the resin.

175 parts by weight of sulfur dichloride are added very slowly to 100 parts by weight of phenol. No diluent is used. The reaction mixture is kept below 5° C., and the mass is stirred during the slow addition of the sulfur dichloride.

The reaction mass is then permitted to stand in an open vessel for 24 hours at room temperature to permit the excess sulfur dichloride to evaporate spontaneously. The resin is then washed with cold water until neutral and then subjected to steam distillation until free from phenol.

The resin at this stage is solid but sticky. In order to harden the same, the resin is fused gently at about 125° C. to remove water. The resin is completely soluble in acetone and completely soluble with cellulose acetate, and forms with cellulose acetate films or compositions that are quite fast to light.

The following examples serve to illustrate coating or plastic compositions made in accordance with this invention.

Example I

A coating composition containing the resin may be made as follows:

| | Parts by weight |
|---|---|
| Cellulose acetate | 10 |
| Synthetic resin | 1 to 20 |
| Acetone | 100 |

Example II

The following is another example of coating composition:

| | Parts by weight |
|---|---|
| Cellulose acetate | 10 |
| Synthetic resin | 1 to 20 |
| Acetone | 50 |
| Benzene | 25 |
| Alcohol (ethyl or denatured) | 25 |
| Diacetone alcohol | 20 |

Example III

The following is an example of a solution that is suitable as an adhesive, and is particularly useful for causing a sheet of celluloid to adhere to surfaces of sheets of glass, cardboard, asbestos, metal, etc.

| | Parts by weight |
|---|---|
| Cellulose acetate | 20 |
| Synthetic resin | 25 |
| Acetone | 60 |
| Ethyl acetate | 30 |
| Ethyl lactate | 10 |

Example IV

Following is an example of a plastic composition:

| | Parts by weight |
|---|---|
| Cellulose acetate | 100 |
| Synthetic resin | 40 |
| Monomethyl xylene sulfonamid | 10 |
| Alcohol | 50 |
| Benzene | 50 |

Example V

The following is an example that may be employed for making artificial yarn by extruding through the orifices of a spinneret into a heated, evaporative atmosphere:

| | Parts by weight |
|---|---|
| Cellulose acetate | 100 |
| Synthetic resin | 20 |
| Acetone | 400 |

Example VI

The following is a formula for pigmented lacquer:

| | Parts by weight |
|---|---|
| Cellulose acetate | 20 |
| Synthetic resin | 25 |
| Diphenylol propane | 10 |
| Pigment | 10 |
| Acetone | 100 |
| Ethyl acetate | 20 |
| Benzene | 20 |
| Toluene | 10 |
| Ethyl lactate | 20 |

Example VII

The following examples are given to illustrate the use of a synthetic resin in connection with cellulose nitrate for various purposes: (a) Coating composition may contain:

| Cellulose nitrate | kilograms | 6 |
|---|---|---|
| Camphor | do | 2 |
| Diethyl phthlate | do | 2 |
| Synthetic resin | do | 10 |
| Benzene | liters | 20 |
| Alcohol | do | 20 |
| Butyl alcohol | do | 20 |
| Butyl acetate | do | 20 |
| Ethyl acetate | do | 30 |

(b) An adhesive solution suitable for use in the preparation of laminated glass may contain:

| Cellulose nitrate | kilograms | 0.4 |
|---|---|---|
| Camphor | do | 0.1 |
| Dibutyl phthlate | do | 0.1 |
| Synthetic resin | do | 1.0 |
| Benzene | liters | 20 |
| Alcohol | do | 10 |
| Butyl alcohol | do | 20 |
| Butyl acetate | do | 20 |
| Ethyl acetate | do | 30 |

In the foregoing examples, the cellulose acetate may be replaced by cellulose propionate, cellulose butyrate, etc. Either the cellulose acetate or the cellulose nitrate may be replaced by cellulose ethers.

It is to be understood that the foregoing detailed description is given merely by way of illustration, and that many variations may be made therein, without departing from the spirit of my invention.

Having described my invention, what I claim and desire to secure by Letters Patent is:

Method of preparing a synthetic resin comprising reacting 100 parts by weight of phenol with substantially 175 parts by weight of sulfur dichloride at temperatures below 20° C. and then removing all the uncombined sulfur dichloride at temperatures not substantially above room temperatures and then hardening the resin by fusing the same.

GEORGE W. SEYMOUR.